(12) United States Patent
Bertagna (10) Patent No.: US 6,934,294 B2
(45) Date of Patent: Aug. 23, 2005

(54) QUALIFIED PRIORITY QUEUE SCHEDULER

(75) Inventor: Drew Bertagna, Oak Park, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/808,105

(22) Filed: Mar. 24, 2004

(65) Prior Publication Data

US 2004/0179535 A1 Sep. 16, 2004

Related U.S. Application Data

(62) Division of application No. 09/517,168, filed on Mar. 2, 2000, now abandoned.

(51) Int. Cl.[7] .............................................. H04L 12/28
(52) U.S. Cl. ....................................... 370/412; 711/154
(58) Field of Search ................................ 370/412–418, 370/395.7, 395.71, 395.4; 711/100, 154, 167

(56) References Cited

U.S. PATENT DOCUMENTS

| | | | | |
|---|---|---|---|---|
| 4,864,629 A | * | 9/1989 | Deering | 382/216 |
| 5,627,966 A | * | 5/1997 | Hanko | 714/49 |
| 6,125,182 A | * | 9/2000 | Satterfield | 380/28 |
| 6,252,608 B1 | * | 6/2001 | Snyder et al. | 345/473 |
| 6,401,117 B1 | * | 6/2002 | Narad et al. | 709/223 |

* cited by examiner

*Primary Examiner*—David Vincent
(74) *Attorney, Agent, or Firm*—Michael Blaine Brooks, PC; Craig A. Hoersten; V. Lawrence Sewell

(57) ABSTRACT

A queue scheduling method and apparatus for a queuing structure including a plurality of queues at different priorities and having different bandwidth privileges competing for the bandwidth of an output. The method selects a queue at the current priority, having data for release to the output and having available bandwidth to release data to the output. If there are a plurality of such queues, round-robin ordering determines which queue in the plurality is selected. The apparatus includes a plurality of bit masks representing the status in relation to a queue state variable of the different queues, which masks are combined in a bit-wise AND operation to determine which queues are selectable for releasing data to the output.

21 Claims, 8 Drawing Sheets

| QUEUE ID | HEAD | TAIL | CURRENT DEPTH | MAX DEPTH | CURRENT CREDIT | TOTAL CREDIT |
|---|---|---|---|---|---|---|
| 0 | | | | | | |
| 1 | | | | | | |
| 2 | | | | | | |
| ... | | | | | | |
| N | | | | | | |

QUALIFIED PRIORITY QUEUE SCHEDULER

CROSS-REFERENCE TO RELATED APPLICATION

This application is a divisional of prior application Ser. No. 09/517,168, filed Mar. 2, 2000, now abandoned.

BACKGROUND OF THE INVENTION

Data communication switches receive packets on a plurality of inputs and transmit them on a plurality of outputs. Sometimes, packets come in on two or more inputs destined for the same output. To minimize collisions between such packets, queueing is used. Queues temporarily store some packets while others are consuming the bandwidth necessary for delivery of the queued packets to an output.

The release of packets from queues competing for output bandwidth is typically coordinated by a scheduler. Many schedulers honor a strict rule of priority scheduling, that is, queues are assigned different priority levels and those associated with relatively high priority levels are allowed to release packets before those associated with relatively low priority levels. Strict priority scheduling allows flows which have been designated as relatively time-critical to take precedence over those which have been designated as relatively less time critical.

Despite its general efficacy, strict priority scheduling is not problem-free. One undesirable effect is priority blocking. Priority blocking occurs when delivery of packets from relatively low priority queues suffer a sustained delay due to servicing of higher priority queues. Priority blocking can eventually cause packets in the blocked queues to be overwritten while awaiting release, a condition known as dropping. Dropping undesirably disrupts the flows to which the dropped packets relate.

While priority scheduling is by design supposed to provide faster service to some queues than others, departure from a strict rule of prioritization may be warranted in certain cases. For instance, priority blocking may be caused by "stuffing" of a single queue at the priority level receiving service with non-critical or even redundant (e.g., in the case of an unresolved spanning tree loop) traffic. Strict adherence to priority scheduling would allow this "stuffing" to in effect hold all of the output bandwidth hostage at the expense of the relatively low priority queues.

Accordingly, there is a need for a qualified priority scheduling method for reducing priority blocking through the imposition of reasonable limitations on a general policy of prioritization. There is also a need for efficient scheduling hardware to effectuate the qualified priority scheduling.

SUMMARY OF THE INVENTION

The present invention provides a qualified priority scheduling method and apparatus for a data queuing structure including a plurality of groups of queues competing for the bandwidth of an output. Each group has at least one queue and is associated with a different priority level. Moreover, at least one queue within at least one group is a restricted bandwidth queue, i.e. has a bandwidth contract which cannot be exceeded.

In accordance with the queue scheduling method, a queue within the group associated with the current priority level which (i) has data for release to the output (ii) has available bandwidth, i.e. has not violated its bandwidth contract (if any), is selected to release data to the output. If there are a plurality of such queues, round-robin ordering determines which queue in the plurality is selected. The current priority level is initially set at the highest priority level and is decremented until a queue is selected or all priority levels have been checked, whichever occurs first. Queues may have restricted or unrestricted bandwidth. Unrestricted bandwidth queues always have available bandwidth, whereas restricted queues have available bandwidth only if they have credit. Credit is allocated to restricted queues periodically and is reduced in accordance with the length of released data. Data are released in quanta of credit.

In accordance with the queue scheduling apparatus, a selector is arranged for selecting a queue from the plurality of queues as a function of a plurality of queue state variables and transmitting queue selection information. The selector preferably includes a plurality of bit masks representing the status in relation to a queue state variable of the different queues, which masks are combined in a bit-wise AND operation to determine which queues are selectable for releasing data to the output. The selector preferably further includes an arbiter for receiving the result of the determination, for selecting a single queue round-robin from the selectable queues and for transmitting the result of the round-robin selection to a driver for releasing from the selected queue.

These and other aspects of the present invention may be better understood by reference to the following detailed description taken in conjunction with the accompanying drawings briefly described below.

DETAILED DESCRIPTION OF THE PREFERRED EMBODIMENT

Figure 1:
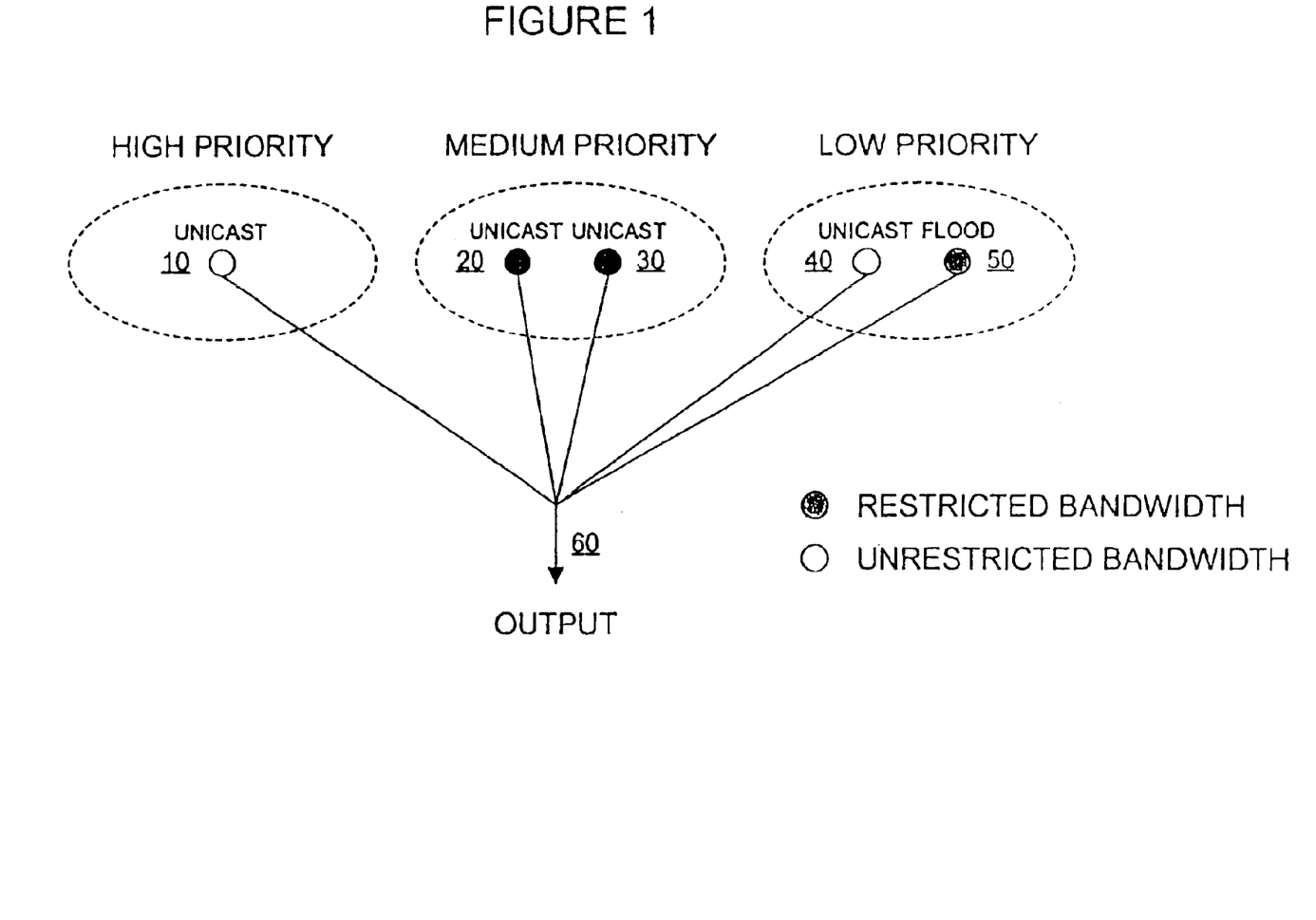
FIG. 1 is a policy level diagram of an exemplary shared-output queuing structure with scheduling characteristics.

The present invention is primarily directed to a method and apparatus for scheduling the release of data from a plurality of queues competing for the bandwidth of an output. In FIG. 1, an exemplary shared-output queuing structure with scheduling characteristics is shown at a policy level. In the exemplary structure, there are five queues 10, 20, 30, 40, 50 competing for the bandwidth of output 60. The release of data from queues 10, 20, 30, 40, 50 is scheduled, i.e. time-multiplexed, to avoid contention. Queues 10, 20, 30, 40, 50 are characterized by priority level, including high priority queue 10, medium priority queues 20, 30 and low priority queues 40, 50 for releasing data to output 60. Queues 10, 20, 30, 40, 50 are further characterized by bandwidth type for releasing data to output 60. The sole high priority queue 10 is an unrestricted bandwidth queue. Both medium priority queues 20, 30 are restricted bandwidth queues. One low priority queue 40 is an unrestricted bandwidth queue, whereas the other low priority queue 50 is a restricted bandwidth queue. Queues 10, 20, 30, 40, 50 are further characterized by flow type, i.e. unicast or flood. However, flow type has no independent bearing on the order in which data are released to output 60. Of course, the shared-output queuing structure illustrated in FIG. 1 is merely one example of such structure; the number, priority level and bandwidth type of queues will differ in other shared-output queuing structures operative in accordance with the present invention depending on the policies it is desired to implement.

In a preferred scheduling method for a shared-output queuing structure, a queue within the group associated with the current priority level which has data for release to the output and has available bandwidth, i.e. has not violated its bandwidth contract, if any, is selected to release data to the output. If there are a plurality of such queues, round-robin ordering resolves which queue in the plurality is selected. Various elaborations of this basic scheduling method are possible, as described hereinafter. Nevertheless, at a fundamental level, this basic method, despite its apparent simplicity, is believed to confer a significant advance over the scheduling methods of the prior art.

Applying the preferred scheduling method to the exemplary shared-output queuing structure illustrated in FIG. 1, if unrestricted bandwidth high priority queue 10 has data for release to output 60, queue 10 is selected. If queue 10 is not selected, restricted bandwidth medium priority queues 20, 30 are checked. More particularly, if queues 20, 30 each have data for release to output 60, and each have available bandwidth, the next-in-line one of queues 20, 30 in round-robin order is selected. If queues 20, 30 each have data for release, but only one of queues 20, 30 has available bandwidth, the one of queues 20, 30 with available bandwidth is selected. If only one of queues 20, 30 has data for release and available bandwidth, that one of queues 20, 30 is selected. If, neither of queues 20, 30 is selected, low priority queues 40, 50 are checked. More particularly, if queues 40, 50 each have data for release to output 60, and restricted bandwidth low priority queue 50 has available bandwidth, the next-in-line one of queues 40, 50 in round-robin order is selected. If queues 40, 50 each have data for release, but restricted bandwidth low priority queue 50 does not have available bandwidth, unrestricted bandwidth low priority queue 40 is selected. If only queue 40 has data for release, queue 40 is selected. If only queue 50 has data for release, queue 50 is selected if queue 50 has available bandwidth. If neither of queues 40, 50 is selected, no data are released to output 60.

Figure 2:
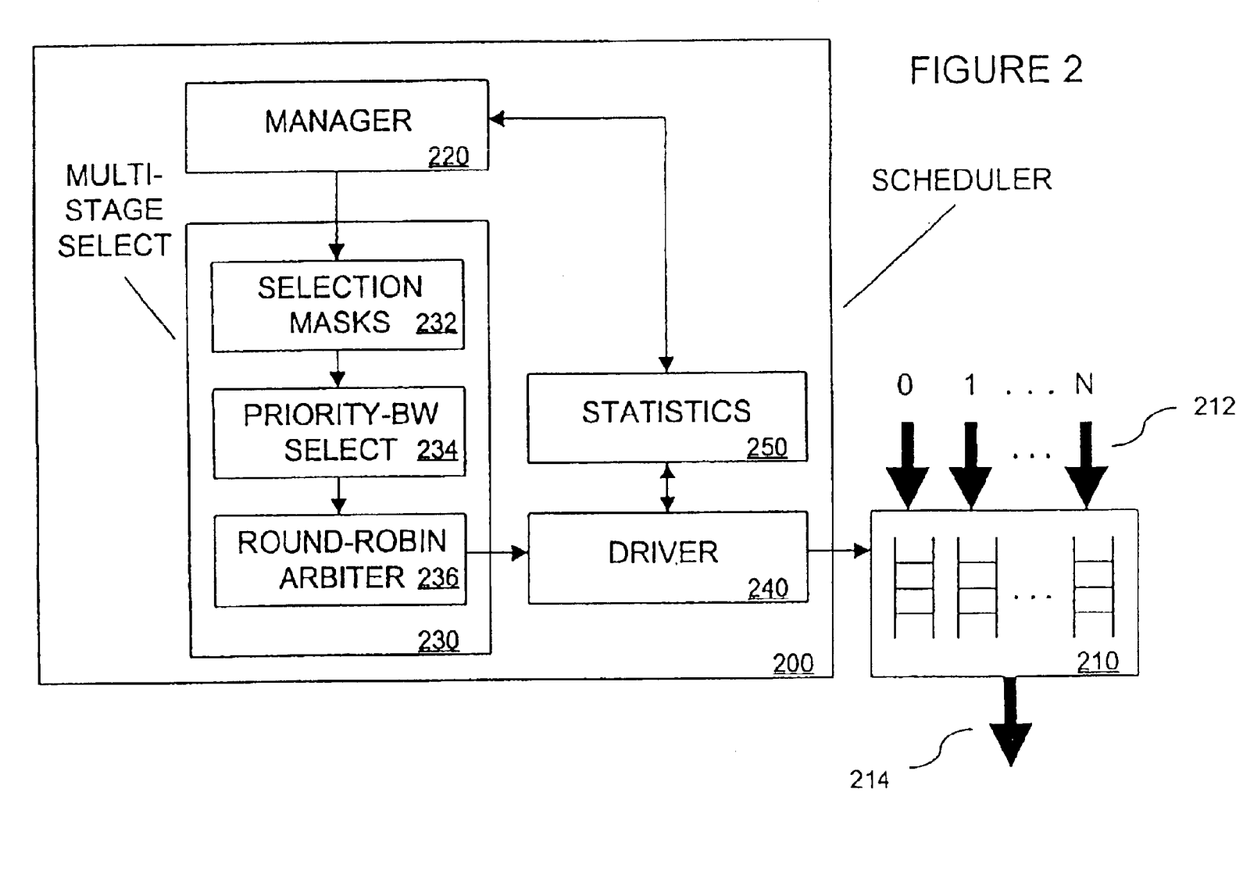
FIG. 2 is a block diagram of a preferred scheduling apparatus for a shared-output queuing structure and an associated queuing structure.

Referring now to FIG. 2, a preferred shared-output scheduling apparatus is shown at a component level along with an associated queue structure. Queuing structure 210 includes data queues 0 through N for receiving data on respective ones of inputs 0 through N 212 and for releasing data to output 214. Release of data from queuing structure 210 is controlled by scheduler 200. Scheduler 200 includes manager 220, multi-stage selector 230, driver 240 and statistics 250. Manager 220 retrieves data from statistics 250 and updates selector 230 and statistics 250. Selector 230 includes selection masks 232, priority-bandwidth selector 234 and round-robin arbiter 236 for facilitating queue selection. Selector 230 selects data queues for releasing data to output 214 and transmits queue selection information to driver 240. Driver 240 receives queue selection information, retrieves data from statistics 250, updates statistics 250, and controls release of data from the selected queues.

Figure 3:
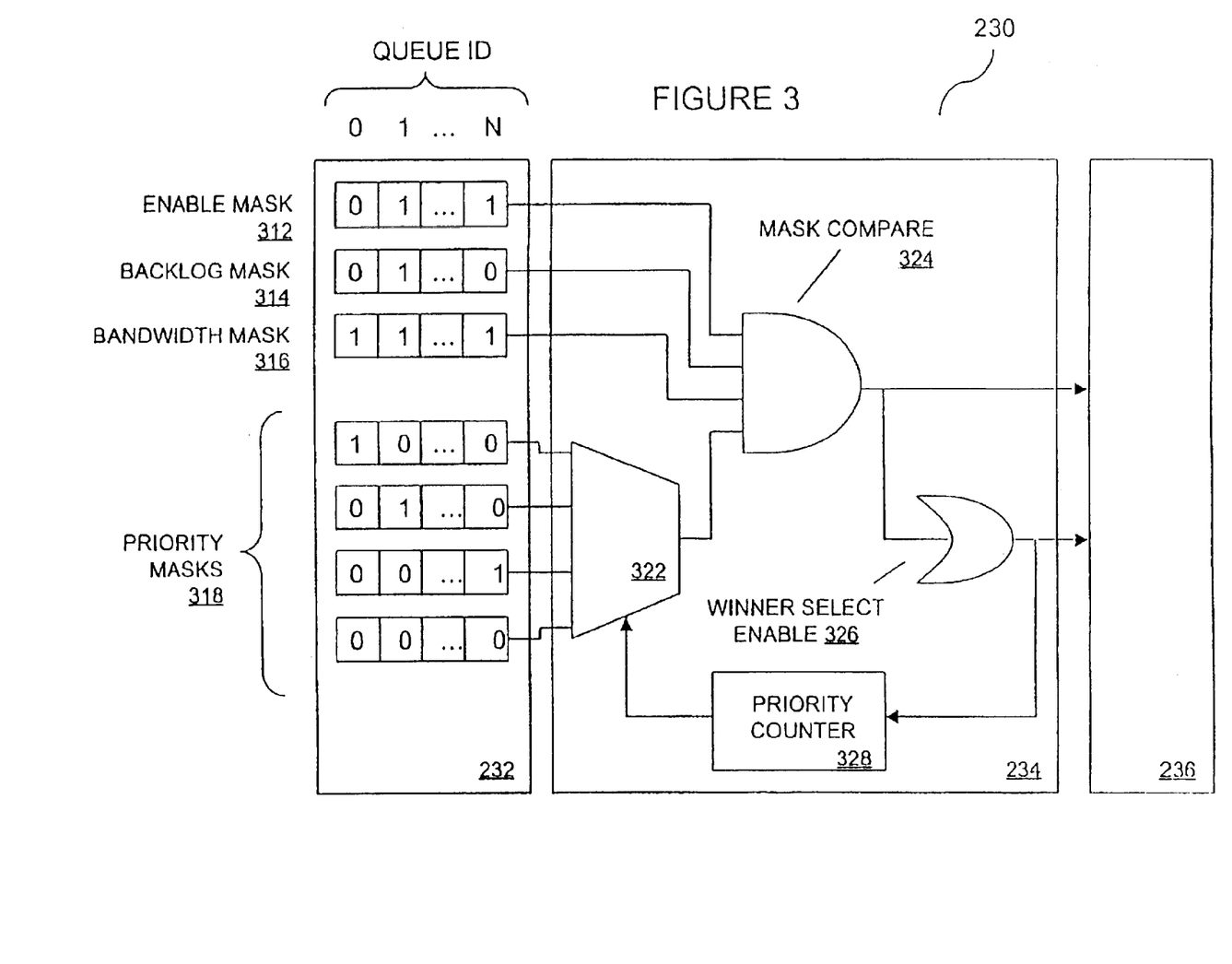
FIG. 3 is a block diagram of the multi-stage selector of FIG. 2.

Referring now to FIG. 3, selector 230 is shown in greater detail. Selector 230 has selection masks 232 including enablement mask 312, backlog mask 314 bandwidth mask 316 and priority masks 318. Each mask maintains a status bit for each of queues 0 through N in memory element 210. Enablement mask 312 indicates which among queues 0 through N are enabled for transmitting data to output 214. A "1" in the bit position reserved for the queue represents enablement, whereas a "0" represents non-enablement. Backlog mask 314 indicates which among queues 0 through N have data awaiting transmission to output 214. A "1" in the bit position reserved for the queue represents the presence of pending data, whereas a "0" represents the absence of pending data. Bandwidth mask 316 indicates which among queues 0 through N has bandwidth for transmitting data to output 214. A "1" represents the availability of bandwidth, whereas a "0" represents the unavailability of bandwidth. Priority masks 318 collectively indicate the priority level of queues 0 through N. A separate priority mask is maintained for each priority level. A "1" in the bit position reserved for the queue in a priority mask indicates assignment of the queue to the priority level which the mask represents, whereas a "0" indicates non-assignment to the priority level. Masks 232 are configurable by manager 220. Backlog mask 314 and bandwidth mask 316 are updated by manager 220 in response to information retrieved from statistics 250.

Selection masks 232 are coupled to priority-bandwidth selector 234. Selector 234 facilitates queue selection by reducing the selection to a round-robin selection among participating queues. When participant selection is enabled, enablement mask 312, backlog mask 314, bandwidth mask 316 and one of priority masks 318 at a time are submitted to mask compare 324 for a bit-wise AND operation. The one of priority masks 318 submitted to the bit-wise AND operation is determined by priority counter 328, which instructs multiplexor 322 to release one of priority masks 318 based on the current value of counter 328. For each participant selection round, counter 328 selects the highest priority mask first and selects priority masks of incrementally lower priority until winner select enablement is indicated at the current priority level, or all priority masks have been submitted.

The result of the bit-wise AND operation performed by mask compare 324 is a mask indicating which queues at the current priority level, if any, are entitled to participate in winner selection performed in round-robin arbiter 236. Particularly, the resultant mask has a "1" at all bit positions reserved for queues which are enabled for output port 214, have pending data, have available bandwidth and are at the current priority level, if any, and has a "0" at other bit positions. Thus, the resultant mask indicates any participating queues by a "1" and any non-participating queues by a "0". The resultant mask is submitted to winner select enable 326 for an OR operation. If at least one bit position in the resultant mask has a "1", the OR operation yields a "1" and winner selection is enabled at the current priority level. Otherwise, the OR operation results in a "0", winner selection is not enabled at the current priority level and the bit-wise AND operation is performed at the next priority level, if any. The OR operation result is supplied as feedback to counter 328 to notify counter 328 whether an additional priority mask selection is required. It will be appreciated that if a "null" mask results from the bit-wise AND operation at all priority levels, winner selection is not enabled and the round-robin arbitration is not conducted.

Figure 4:
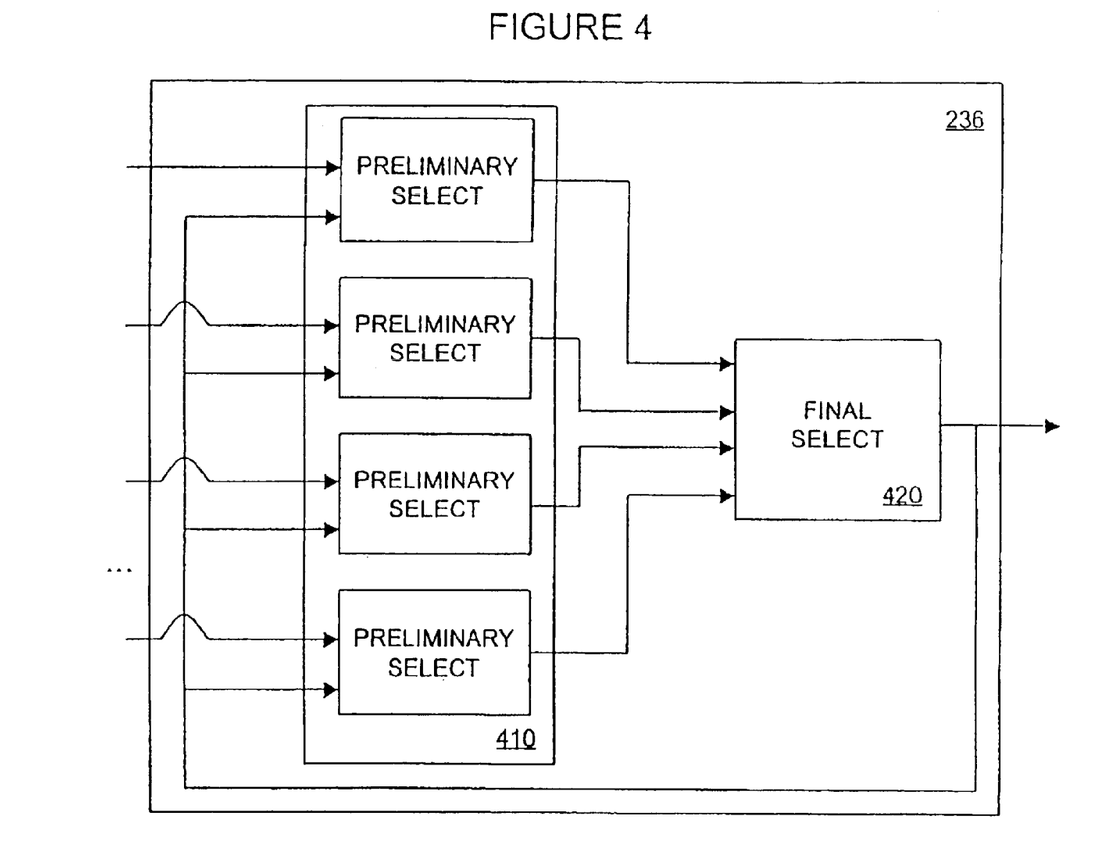
FIG. 4 is a block diagram of the round-robin arbiter of FIG. 2.

Priority-bandwidth selector 234 is coupled to round-robin arbiter 236. Round-robin arbiter 236 resolves a winning queue by making a round-robin selection among participating queues as determined by selector 234. Turning to FIG. 4, round-robin arbiter 236 is shown in greater detail. When winner selection is enabled, the participating queue mask, i.e. the mask resulting from the bit-wise AND operation performed in selector 234, is submitted to preliminary select array 410 for qualifying queue determinations. Particularly, each preliminary select element in array 410 receives a subset of bits from the participating queue mask and selects a single qualifying queue from among the participating queues, if any, that it represents. More particularly, the preliminary select element whose qualifying queue was selected as the winning queue by final select 420 in the last round-robin arbitration selects as a qualifying queue the next one of its participating queues in round-robin order, if any. The other preliminary select elements select as a qualifying queue the first one of their respective participating queues, if any. The qualifying queue selections are submitted to final select 420 along with any "no qualifier" notices from any preliminary select elements not representing any participating queues. Moreover, if the preliminary select element whose qualifying queue was selected as the last winning queue wrapped-around, i.e. returned from its last to first queue in the round-robin order in the course of making the selection, the preliminary select element submits a "wrap-around" notice to final select 420. Final select 420 selects as a winning queue the qualifying queue from the preliminary select element whose qualifying queue was selected as the last winning queue, unless that preliminary select element submitted a "no qualifier" or "wrap-around" notice. If that preliminary element submitted a "no qualifier" or "wrap-around" notice, final select 420 selects as the winning queue the qualifying queue from the next one of the preliminary select elements in round-robin order, if any. Final select 420 transmits the winning queue identifier to queue driver 240 in completion of the round-robin arbitration. The winning queue identifier is also supplied as feedback to array 410 for use by preliminary select elements in subsequent qualifying queue selections.

Figure 5:
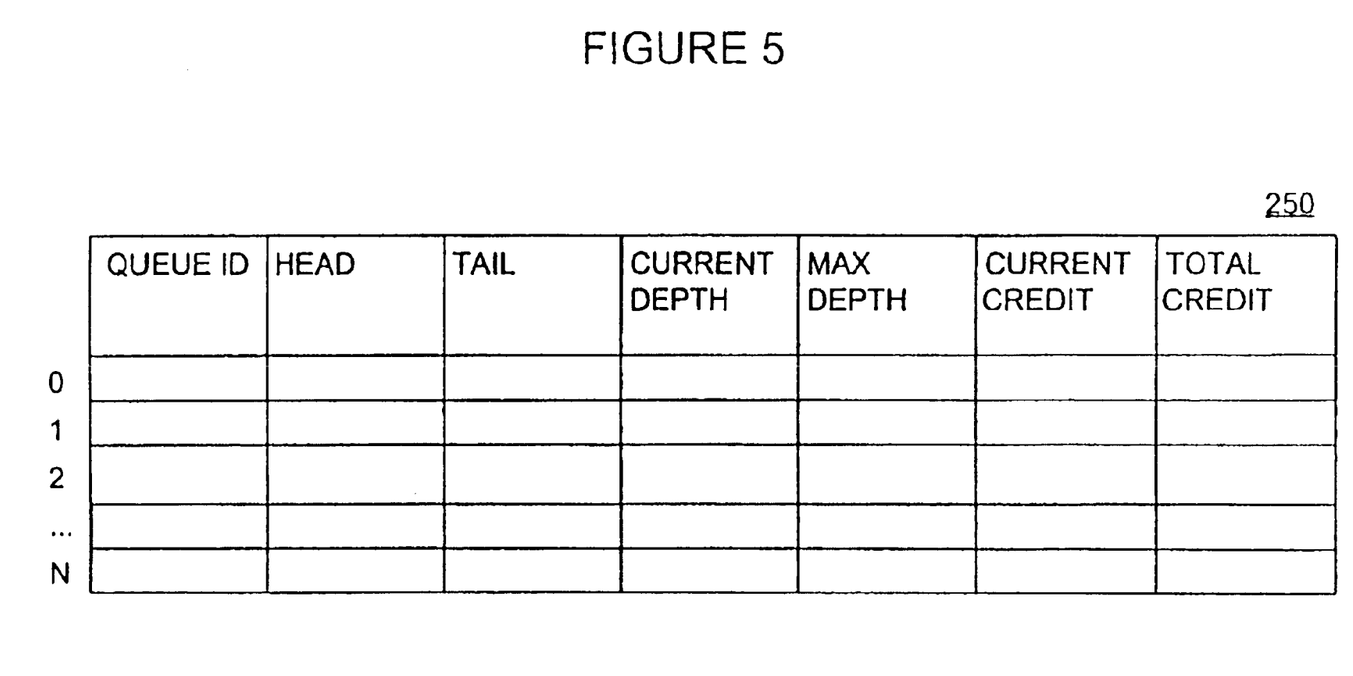
FIG. 5 is a block diagram of statistics of FIG. 2.

Referring now to FIG. 2 in conjunction with FIG. 5, in response to the winning queue identifier received from selector 230, driver 240 consults statistics 250 to retrieve queue state information and controls the release of data from the winning queue to output 214. Statistics 250 maintain multi-field entries for each of queues 0 through N within queuing structure 210 including a queue identifier, a head pointer, a tail pointer, current depth, maximum depth, current credit and total credit values. The winning queue identifier is used to "look-up" the corresponding entry in statistics 250. A predetermined quantum of credit is added to the current credit value for the corresponding entry. A quantum may be advantageously selected in relation to the maximum length of a packet formatted in accordance with a particular protocol, such as 1518 bytes for an Ethernet packet. Driver 240 controls release of data from the winning queue to output 214 beginning with the data at the queue location indicated by the head pointer in the corresponding entry, until all data have been released from the winning queue, the current credit has been exhausted or, in the case of a restricted bandwidth queue, or the total credit has been exhausted, whichever occurs first. Driver 240 updates the head pointer, current depth, total credit value and current credit values for the corresponding entry as data are released to reflect the changing queue state. The current credit value is "zeroed out" if all data have been released or, in the case of a restricted bandwidth queue, the total credit is exhausted before the current credit.

Manager 220 consults statistics 250 to ensure that selection masks 232 reflect the queue state changes made by driver 240. Current depth values in entries are consulted to refresh backlog mask 312 and total credit values in entries are consulted to refresh bandwidth mask 316. Manager 220 also periodically refreshes total credit values in entries maintained for restricted bandwidth queues.

Figure 6:
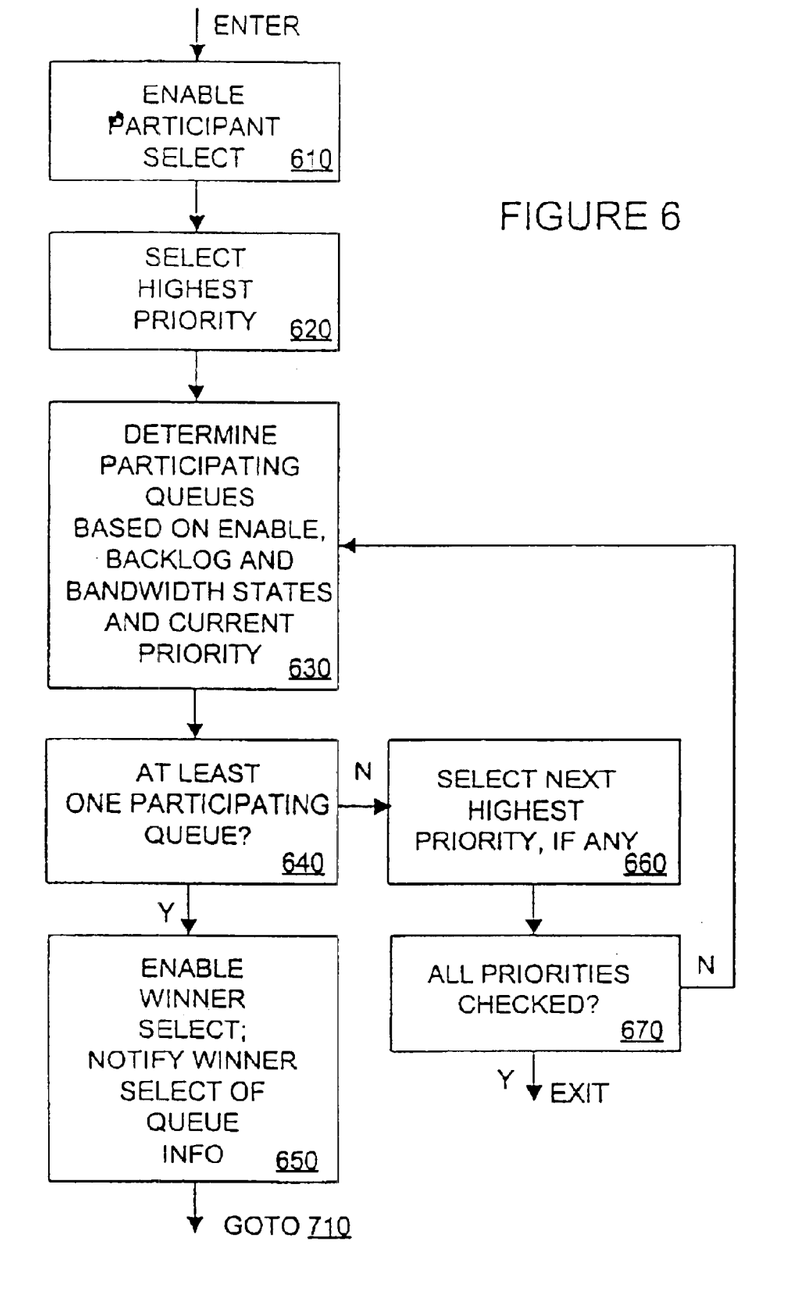
FIG. 6 is a flow diagram of priority-bandwidth queue selection steps.

Turning now to FIG. 6, a flow diagram of priority-bandwidth queue selection is shown. Participant selection is enabled (610) and the highest priority is selected as the current priority (620). Participating queues at the current priority, if any, are determined based on queue enablement, backlog and bandwidth states and priority (630). If there is at least one participating queue at the current priority (640), winner selection is enabled and the round-robin arbiter is notified (650). If not, the next highest priority, if any, is selected as the current priority (660). If not all priorities have been checked, the flow returns to Step 630; otherwise, the flow is exited (670).

Figure 7:
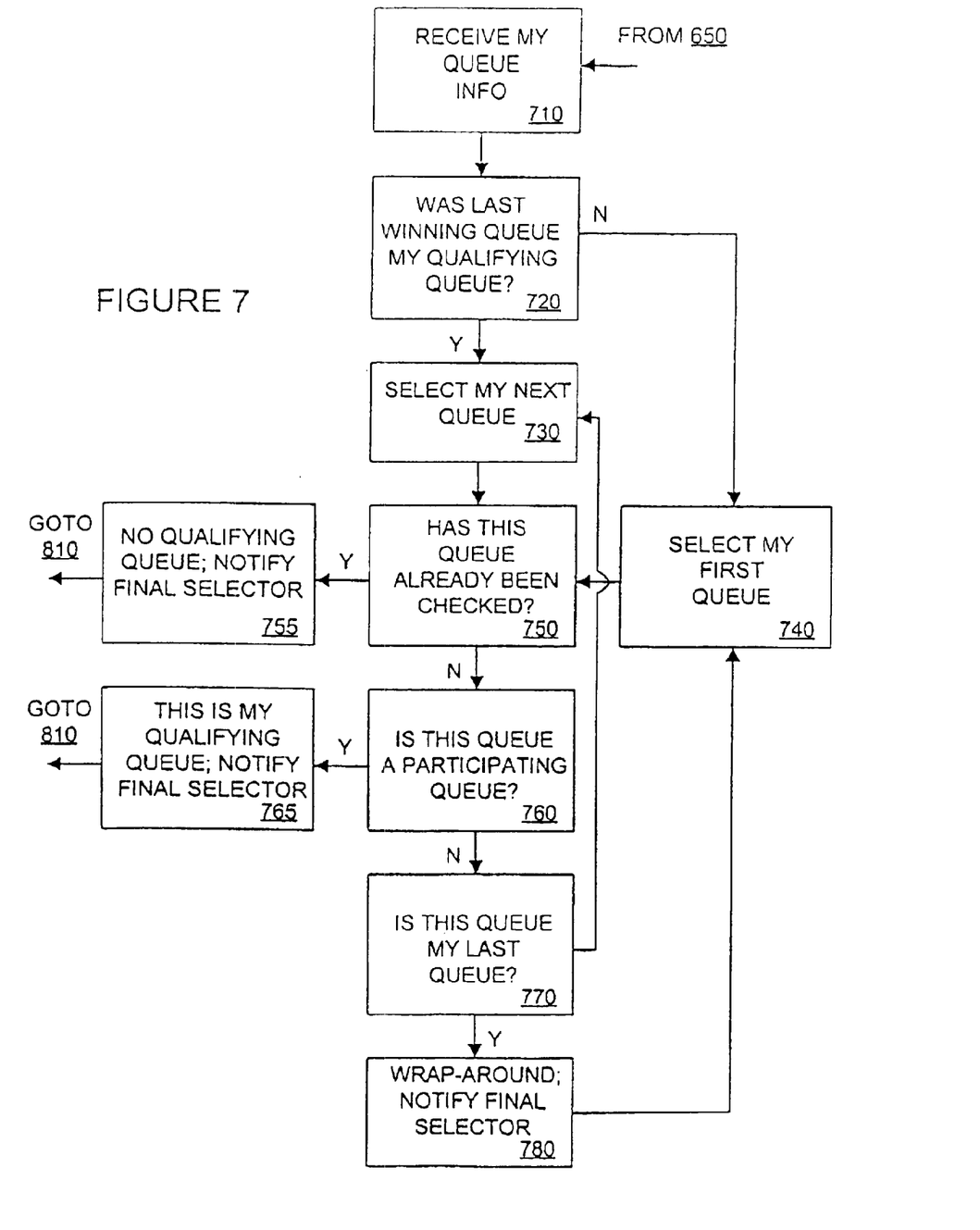
FIG. 7 is a flow diagram of qualifying queue selection steps of round-robin arbitration.

Turning to FIG. 7, a flow diagram of qualifying queue selection in round-robin arbitration is shown for a representative preliminary select element. The element receives information for the queues the element represents (710) and checks whether the last winning queue was the element's last qualifying queue (720). If the last winning queue is the element's last qualifying queue, the element selects the next (participating or non-participating) queue the element represents in round-robin order (730). If the last winning queue is not the element's last qualifying queue, the element selects the first (participating or non-participating) queue the element represents as the current queue (740). In either event, the element checks whether the current queue has already been checked for participation in this selection round (750). If the current queue has already been checked for participation, the element has no qualifying queue in this selection round and the final selector is notified (755). If the current queue has not already been checked for participation, it is checked (760). If the current queue is a participating queue, the current queue is the qualifying queue and the final selector is notified (765). If the current queue is not a participating queue, a further check is made to determine if the current queue is the last queue the element represents (770). If the current queue is the last represented queue, the element wraps-around, the final selector is notified and the flow returns to Step 740. If the current queue is not the last represented queue, the flow returns to Step 730.

Figure 8:
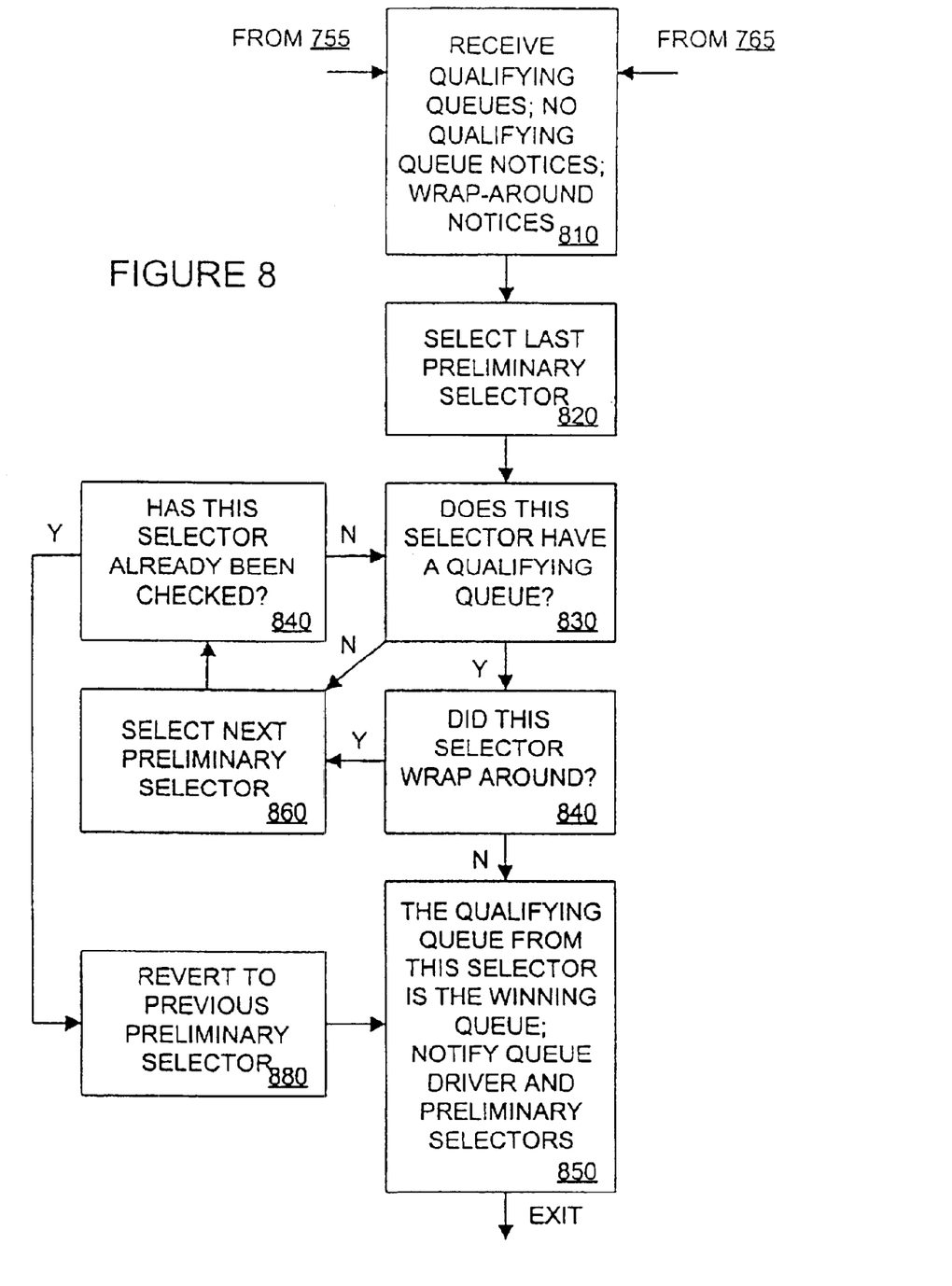
FIG. 8 is a flow diagram of winning queue selection steps of round-robin arbitration.

Turning finally to FIG. 8, a flow diagram winning queue selection in round-robin arbitration is shown. The qualifying queues, "no qualifier" notices, if any, and "wrap-around" notices, if any, are received (810) and the preliminary select whose qualifying queue won the last arbitration is selected as the current element (820). A check is made whether the current element has a qualifying queue in this selection round (830). If the current element has a qualifying queue in this selection round, a further check is made whether the current element wrapped-around (840). If the current element did not wrap-around, the qualifying queue from the current element is the winning queue, the queue driver and elements are notified and the flow is exited (850). If, however, the current element does not have a qualifying queue, or the current element wrapped-around, the next element in round-robin order is selected as the current element (860). If the new current element has already been checked in this selection round (870), the previous element is reverted to as the current element and the flow goes to Step 850. If the new current element has not already been checked in this selection round, the flow returns to Step 830.

It will be appreciated by those of ordinary skill in the art that the invention can be embodied in other specific forms without departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

I claim:

1. A queue selector operably coupled to a plurality of queues and an output, the queue selector comprising:
    a plurality of masks, wherein each mask comprises a plurality of bits and is associated with one of a plurality of queue state variables, each bit representing the status of the associated queue state variable for a different queue of the plurality of queues, and
    a mask compare adapted to:
        combine the plurality of masks in a bit-wise AND operation, and
        select a queue of the plurality of queues from which to release data to the output using the combined plurality of masks.

2. The queue selector according to claim 1, wherein the plurality of queue state variables comprise backlog.

3. The queue selector according to claim 1, wherein the plurality of queue state variables comprise bandwidth availability.

4. The queue selector according to claim 1, wherein the plurality of queue state variables comprise priority.

5. The queue selector according to claim 1, wherein the queue selector further comprises an arbiter adapted to select a wining queue from which to release data to the output, wherein the winning queue is selected from among two of more candidate queues of the plurality of queues, each candidate queue having data for release and available bandwidth.

6. The queue selector according to claim 5, wherein the arbiter is adapted to select from among the two or more candidate queues using round-robin.

7. The queue selector according claim 1, wherein the plurality of masks comprises:
    a first group of two of more queues of the plurality of queues at a first priority, and
    a second group of one or more queues of the plurality of queues at a second priority,
    wherein the first priority and second priority are different.

8. The queue selector according claim 7, wherein mask compare is further adapted to:
    combine the masks associated with the two or more queues of the first group;
    if one or more queues associated with the first group has data for release, select one of said two or more queues associated with the first group to release data to the output.

9. The queue selector according to claim 8, wherein the mask compare is further adapted to, if no queue associated with the first group has data for release:
    combine the masks of the one or more queues associated with the second group, and
    if one or more queues associated with the first group has data for release, select one of said one or more queues associated with the second group to release data to the output.

10. The queue selector according to claim 8, wherein the mask compare is further adapted to select one of said two or more queues associated with the first group to release data to the output by round-robin, if two or more of queues associated with the first group have data for release.

11. The queue selector according to claim 7, wherein one or more of the plurality of queues is characterized by an available bandwidth, and wherein the mask compare is adapted to decrease the available bandwidth for each of the respective queues when the respective queue is selected to release data to the output.

12. The queue selector according to claim 7, wherein the mask compare is adapted to increase the available bandwidth of one or more queues of the plurality of queues with one or more credits.

13. The queue selector according to claim 12, the mask compare is adapted to decrease the available bandwidth of one or more queues of the plurality of queues from which data are released to the output in accordance with the length of the data released.

14. A queue selection method, comprising the steps of:
    defining a mask for each queue state variable of a plurality of queue state variables, each mask having a plurality of bits representing the status of the associated queue state variable for a different queue of a plurality of queues;
    determining a queue state for each of the plurality of queues by combining, for each of the plurality of queues, a bit associated with the queue from each of the plurality of masks; and
    identifying one or more qualifying queues of the plurality of queues, each of the one or more qualifying queues having a queue state characterized by a positive queue selection criterion.

15. The queue selection method of claim 14, wherein the positive queue selection criterion is an operand having a numerical value of "1."

16. The queue selection method of claim 15, wherein the step of combining the bit associated with the queue from each of the plurality of masks comprises the step of executing a bit-wise-AND operation on the bits from the plurality of masks associated with the queue.

17. The queue selection method of claim 14, wherein the step of defining a mask comprises the step of defining a backlog mask associated with a backlog queue state variable.

18. The queue selection method of claim 14, wherein the step of defining a mask comprises the step of defining a bandwidth-availability mask associated with a bandwidth-availability queue state variable.

19. The queue selection method of claim 14, wherein the step of defining a mask comprises the step of defining a priority mask associated with a priority queue state variable.

20. The queue selection method of claim 14, wherein the method further comprises, after the step of identifying one or more qualifying queues, the step of selecting a winning queue from among the one or more qualifying queues, wherein data from the winning queue is released to an output.

21. The queue selection method of claim 20, wherein the step of selecting a winning queue from the one or more qualifying queues is made round-robin.

* * * * *